Patented May 4, 1948

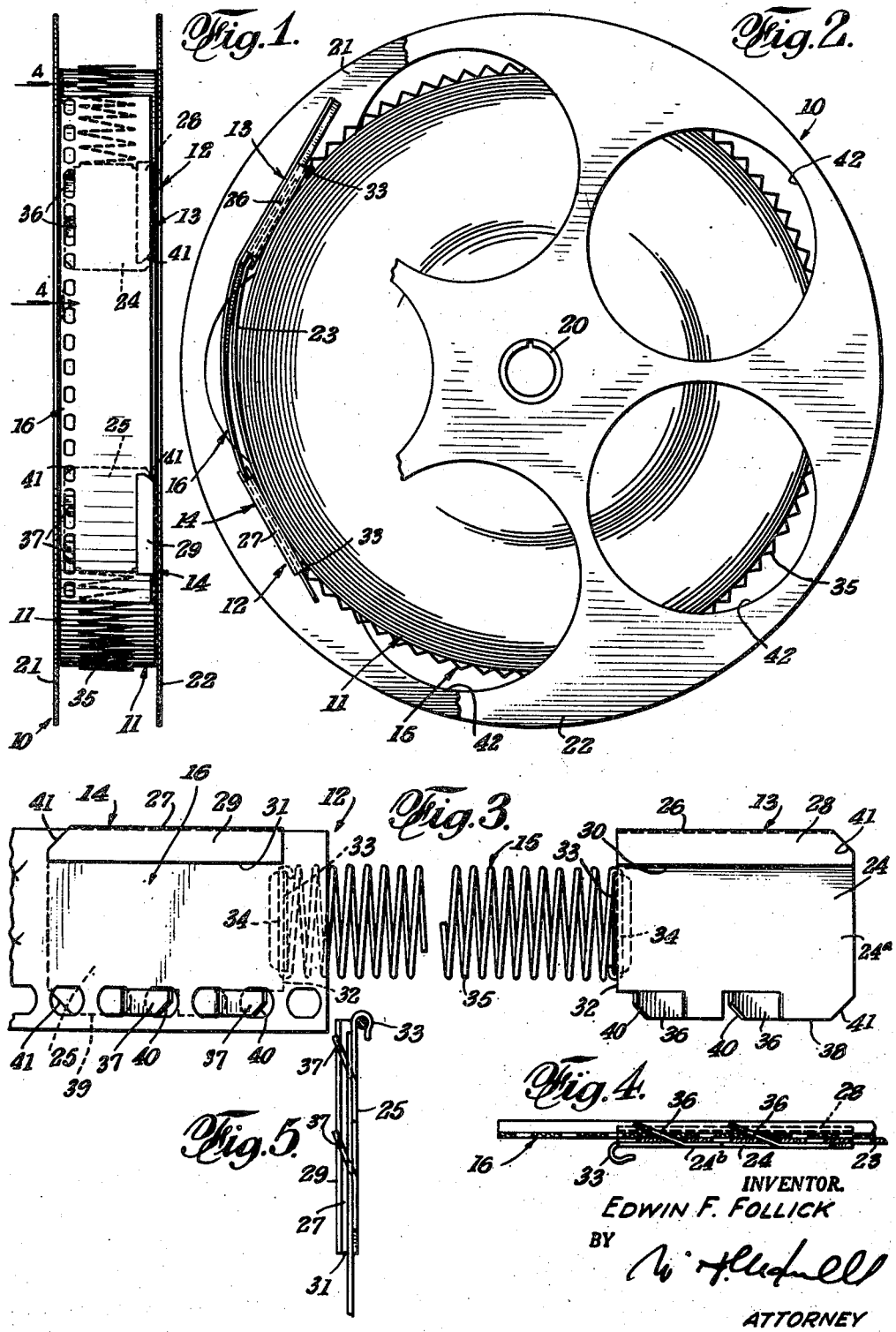

2,440,853

UNITED STATES PATENT OFFICE 2,440,853

RETAINER FOR REELED FILM

Edwin F. Follick, Los Angeles, Calif.

Application May 5, 1945, Serial No. 592,181

7 Claims. (Cl. 206—53)

This invention relates to means for retaining wound or coiled strips from unwinding or uncoiling and relates more particularly to a retainer for reeled film. An object of my invention is to provide a retainer of the character referred to which is simple, inexpensive, easy to apply and remove, and which can be easily used without danger of marring or otherwise mutilating reeled strips and especially coated strips such as picture film, or the like.

Various expedients have heretofore been used for preventing the unwinding of a wound or coiled strip. These have included pins, adhesive strips, elastic bands, etc., which while effective to some degree for retaining certain coiled strips in wound conditions are particularly ineffective for reeled film or the like. Pins, obviously, cause undesired mutilation of film. Adhesive strips are objectionable for the reason that they frequently leave a gummy or tacky deposit on the film. This deposit will foul the operating parts of a camera or projector handling the film, and particularly the gates of such machines with resultant impairment of their efficient operation. Elastic bands are faulty, because they dry out and, finally, crack and break. The tension of such bands cannot be readily controlled, as the bands vary and the action of such a band varies with the diameter of a reel of film. Further, such bands frequently are displaced and become lodged or wedged between the coil of film and the disc-like side of the supporting spool or reel on which said film is wound. In such case great difficulty and inconvenience is encountered in removing the wedged-in band since the film cannot be unwound from the reel until the band is removed. In some cases the band can be removed only by destroying it.

Another object of my invention is to provide a retainer of the character indicated including elastic means for retaining the outer convolutions of a coiled strip in place and incorporating simple means for adjusting the tension of said elastic means to obtain desired and effective strip retaining tension.

Another object of my invention is to provide a retainer of the type indicated including a pair of cooperating tension-held elements each having novel means for quickly and easily engaging or hooking onto a coiled strip of picture film.

A further object of my invention is to provide a retainer for reeled picture film utilizing the sprocket holes of the film in the application of the retainer to the film.

A still further object of my invention is to provide a novel element of which two may be used with connecting elastic means for retaining reeled film in place, and which is also adapted to be used for hanging or suspending film, or the like, to be dried.

The various objects and features of my invention will be fully understood from the following detailed description of a typical preferred form and application of the invention, throughout which description reference is made to the accompanying drawings, in which:

Fig. 1 is an edge elevational view of a film containing reel having an embodiment of the invention applied thereto;

Fig. 2 is a side view thereof, one reel plate being partly broken away;

Fig. 3 is an enlarged plan view of a film retainer;

Fig. 4 is an enlarged sectional view as taken on the line 4—4 of Fig. 1; and

Fig. 5 is a side view of an element of the film retainer as used to hang or suspend film.

In this application the term "film" is intended to refer to picture film which has sprocket holes along one or both edges; other strips or webs, whether cellulosic, metallic, fabric, etc., which may have similar holes along the edges thereof; or paper, woven, knitted, or like strips capable of being readily pierced. The terms "reeled film," "reel," or like terms are intended to include spirally wound or coiled strips or bands of whatever nature or composition, whether wound on a holder such as a reel or not.

My invention may be advantageously used in a variety of fields. I have chosen to illustrate in the drawing a preferred embodiment of the invention as applied to a reel of picture film of conventional form. Accordingly, I have shown a film reel 10 having a quantity of picture film 11 wound or reeled thereon, and have shown a film retainer 12 embodying my invention holding the film on the reel.

The film retainer or retaining means 12 may be said to comprise elements 13, and 14, which are in the nature of fasteners and either of which is adapted to connect or hook to the end of the outer film coil or convolutions; elastic means 15 connecting the elements 13 and 14 and adapted to be trained or wrapped around the reeled film so there is a variable gap between said elements 13 and 14; and a length of film or leader 16 adapted to connect said elements 13 and 14 and completing the encirclement of the reeled film.

The reel 10, conventionally, comprises a central sleeve 20 and side flanges or discs 21 and 22.

I have shown the film 11 wound on the sleeve 20 and with an outer convolution 23. The reeled film 11 may vary in footage with a corresponding variation in the outer diameter of the roll on the reel. This diameter may also vary in accordance with the degree of tightness with which the film is wound.

The retainer 12 which I have provided comprises, essentially, the elements 13 and 14 connected by the elastic member 15, and in its preferred form it includes the leader 16. The elements 13 and 14 may be made in various ways. In the form of the invention illustrated element 13 has a body portion in the form of a plate 24 with an upper face 24$^a$ and a lower face 24$^b$. The body of element 13 is substantially rectangular and the upper and lower faces are flat and smooth so that they will not mar or injure film that may contact them. An upstanding flange 26 is provided along one side of the body 24 and is formed to project laterally of the top face 24$^a$ of the body. A lip 28 projects from the upper edge of the flange 26 to overlie the edge portion of the body 24 and to form a groove or channel 30 suitable for the reception of the edge portion of a film. In accordance with the preferred construction the flange and lip are integral with the body 24 and are simply formed by bending the marginal or edge portion of the plate or sheet of metal that forms the body 24.

The element 14 is substantially the same as element 13 in that it has a body 25 corresponding to body 24, an upstanding flange 27 corresponding to flange 26, and a lip 29 corresponding to lip 28.

The elements 13 and 14 are generally similar except that they are opposite to each other in form and design. At the similar end edges 32 of each element, which I will term the ends, a reversely rolled hook 33 is provided for connection with the end loops 34 of a flattened coil spring 35 comprising the elastic means 15. While I have shown the elastic means 15 as comprising a spring, it may be made as an elastic band or web of various forms or of any suitable stretchable material.

According to my invention I provide the elements 13 and 14 with means for engaging and hooking into the sprocket holes of picture film. I provide such means in a simple manner by forming angularly outwardly directed hooks or posts 36 and 37 sheared from the plates 24 and 25, respectively, and located along the side edges 38 and 39 of said plates opposite to the flanges 26 and 27. The ends 40 of each of the posts 36 and 37 is shaped for easy engagement in the film holes.

The hook forming posts 36 provided on element 13 are located at the edge portion of the body 24 opposite the edge at which the flange 26 is located. The posts 36 project upwardly from the body 24 to project above the plane of the top face 24$^a$ of the body and are shaped and proportioned to enter film holes or perforations so that a film may be engaged with them so as to seat on the face 24$^a$ of the body. In accordance with my preferred construction the posts 36 are formed to project laterally and also longitudinally of the plate 24, that is, they are angularly disposed so as to be pitched in the direction of the inner end of the element 13 or toward the end of the element connected to means 15. By thus pitching the posts they will effectively hold a film when force is applied tending to tension the means 15 and will readily release the film when it is moved in the opposite direction.

In practice I can employ any desired number of posts 36 on the element 13. For example, the structure can be made to operate successfully with one post or with several posts. When more than one post is used it is important to space the posts distances equal to the spacing of the film perforations or in multiples thereof.

The element 14 is provided with one or more posts 37 similar or corresponding to the posts 36 of element 13. The posts 37 are at the edge of element 14 opposite the flange 27 and project in the same direction from the body 25 of element 14. The posts 37 project diagonally to face in the direction of the end body to which the element 15 is connected. When the structure is assembled, as illustrated in Fig. 3, it will be noted that the posts 36 and 37 face oppositely or toward each other.

The means 12 further includes the length of film or leader 16 above indicated, said leader comprising any cutting from a film strip suitable for the present purpose.

The retaining means of the present invention is applied in the following simple manner. Assuming that the reeled film 11 is wound in a clockwise direction, as shown in Fig. 2, the unit shown in Fig. 3 is connected to the end of the outer convolution 23 of the film by slipping said film end into the groove 30 of the element 13 and introducing the posts 36 of said element into aligned sprocket holes of said film end. By pulling slightly upon said element 13 in the direction of the convolutions of the film, said film end will slip down into flat engagement with the plate 24 as best seen in Fig. 4. With the element 13 thus hooked to the film end, the spring is trained around the reeled film in the direction in which the film is wound to bring the element 14 around said reeled film to a position approaching but spaced from the element 13. At this time, or before the element 13 is hooked to the film end, the leader 16 is hooked on or connected to the element 14 in the manner described for the connection of the element 13 and the film end. The leader 16 thus forms an extension of the element 14. By hooking the extending end of said leader 16 over the posts 36 of the element 13 and on top of the end of the film convolution 23, the reeled film 11 is effectively held and retained from unwinding. When hooking the leader 16 to either of the posts 36 or 37, the opposite longitudinal edge of the leader may either be placed in the groove or channel 30 or upon the lip 28 of the elements 13 and 14, as desired. Effective connection of the parts is obtained by either method. Since the sprocket holes of the leader 16 can be selectively chosen for engagement with the posts 36, any desired tension can be imparted to the elastic means 15. Also, since the leader 16 may be of any desired length, the retaining means 12 can be applied to reeled film varying considerably in diameter.

Frequently, film is wound loosely to obviate scratching or otherwise marring sensitive film coatings. My retainer can be effectively employed to hold such loose wound film because the tension thereof can be controlled and because the retainer does not act to apply any forces in the direction of the film convolutions but rather applies a light uniformly distributed force inwardly toward the center of the reel. When applying the retainer to loosely wound film the loosely wound condition of the film is retained and is undisturbed when the leader 16 is finally hooked in place by pressing upon the sides 21 and 22 of the reel as the tension of the retainer is applied.

My retainer can be employed on reeled film wound either clockwise or counter-clockwise since either element 13 or 14 can be connected to the end of the outer film convolution. For easier application of my retainer the plates 24 and 25 may be beveled as at 41 to reduce the possibility of the elements 13 and 14 catching in the conventional opening 42 of the reel sides 21 and 22. The retainer will maintain its position without shifting and will effectively hold the reeled film from unwinding until ready for use.

The retainer is easily removed by merely unhooking the leader 16 from the posts 36 of the element 13, unwrapping the elastic means 15, and finally unhooking the element 13 from the end of the film convolution 23. The reeled film is ready for use with assurance that the retainer which I have provided has not harmfully affected its functional efficiency. Also, the retainer just removed from a reel can be immediately applied upon another reeled film as quickly and as easily as above indicated.

Either or both of the element 13 and 14 may be disconnected from the connecting means 15 to provide a hanger for film. The hook 33 is adapted to engage a wire or cord 45 as shown in Fig. 4 and when one of the elements is so hung film may be suspended from the posts. By means of the film hanger thus provided the film is merely engaged by its sprocket holes and is not pinched or clamped as in prior devices for this purpose.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A retainer for reeled film, or the like, comprising an element adapted to be connected to the end of the outer convolution of said film, a second and similar element, elastic means connecting said elements and adapted to be trained around said reeled film, and a strip connecting said elements and completing the encirclement of said reeled film.

2. A retainer for reeled film or the like comprising an element adapted to be hooked to the end of the sprocket holes of the outer convolution of said film, a second and similar element, elastic means connecting said elements and adapted to be trained around said reeled film, and a strip of film connecting said elements and completing the encirclement of said reeled film.

3. A retainer for reeled film or the like comprising an element adapted to be hooked to the end of the sprocket holes of the outer convolution of said film, a second and similar element, elastic means connecting said elements and adapted to be trained around said reeled film, and a strip of film having its sprocket holes hooked to both elements to connect the same and to complete the encirclement of said reeled film.

4. A retainer for reeled film or the like comprising an element adapted to be connected to the end of the outer convolution of said film, a second and similar element, elastic means connecting said elements and adapted to be trained around said reeled film, said elastic means comprising a flattened coil spring, and a strip connecting said elements and completing the encirclement of said reeled film.

5. A retainer for reeled film or the like comprising an element adapted to be hooked to the end of the sprocket holes of the outer convolution of said film, a second and similar element, elastic means connecting said elements and adapted to be trained around said reeled film, said elastic means comprising a flattened coil spring, and a strip of film connecting said elements and completing the encirclement of said reeled film.

6. A retainer for reeled film or the like comprising an element adapted to be hooked to the end of the sprocket holes of the outer convolution of said film, a second and similar element, elastic means connecting said elements and adapted to be trained around said reeled film, said elastic means comprising a flattened coil spring, and a strip of film having its sprocket holes hooked to both elements to connect the same and to complete the encirclement of said reeled film.

7. A retainer for a spirally coiled perforate band including a pair of similar elements, each having a post-like projection, the projection of one element being arranged to engage and hold the outer convolution of said coiled band by entering a perforation therein, an elastic member connecting said elements and adapted to be trained around said coiled band, and a strip of film with perforations receiving the projections of said elements connecting said elements and completing the encirclement of said coiled band for engagement of the post-like projection of one element in a hole of the coiled band and also in a hole in the strip of film while the post-like projection of the other element is engaged in a hole of the strip of film.

EDWIN F. FOLLICK.

REFERENCES CITED

The following references are of record in the file of this patent:

UNITED STATES PATENTS

| Number | Name | Date |
|---|---|---|
| 1,297,606 | Stultz | Mar. 18, 1919 |
| 1,392,910 | Chase | Oct. 11, 1921 |
| 1,672,214 | Hayden | June 5, 1928 |
| 1,839,407 | Mercer | Jan. 5, 1932 |
| 2,155,769 | Porter | Apr. 25, 1939 |